US011269683B1

(12) United States Patent
Kutzke et al.

(10) Patent No.: US 11,269,683 B1
(45) Date of Patent: Mar. 8, 2022

(54) AGENT CONFLICT RESOLUTION

(71) Applicant: United States of America as represented by the Secretary of the Navy, Arlington, VA (US)

(72) Inventors: Demetrious Kutzke, Panama City, FL (US); Matthew Bays, Panama City, FL (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 9 days.

(21) Appl. No.: 16/940,134

(22) Filed: Jul. 27, 2020

(51) Int. Cl.
*G06F 9/48* (2006.01)
*G06F 9/50* (2006.01)
*G06F 9/52* (2006.01)
*G06F 9/38* (2018.01)

(52) U.S. Cl.
CPC .......... *G06F 9/4881* (2013.01); *G06F 9/3836* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4875* (2013.01); *G06F 9/4893* (2013.01); *G06F 9/50* (2013.01); *G06F 9/5005* (2013.01); *G06F 9/5011* (2013.01); *G06F 9/5022* (2013.01); *G06F 9/5027* (2013.01); *G06F 9/5044* (2013.01); *G06F 9/5061* (2013.01); *G06F 9/5072* (2013.01); *G06F 9/5083* (2013.01); *G06F 9/5088* (2013.01); *G06F 9/52* (2013.01)

(58) Field of Classification Search
CPC ........ G06F 9/48; G06F 9/4806; G06F 9/4813; G06F 9/485; G06F 9/4856; G06F 9/4875; G06F 9/4881; G06F 9/4893; G06F 9/50; G06F 9/5005; G06F 9/5011; G06F 9/5022; G06F 9/5027; G06F 9/5044; G06F 9/5061; G06F 9/5072; G06F 9/5083; G06F 9/5088; G06F 9/52; G06F 9/3836; G06F 9/4843
See application file for complete search history.

(56) References Cited

U.S. PATENT DOCUMENTS

| | | | |
|---|---|---|---|
| 10,871,988 B1* | 12/2020 | Gao | G06F 9/4881 |
| 2008/0196037 A1* | 8/2008 | Ple | G06F 9/3885 718/107 |
| 2009/0222654 A1* | 9/2009 | Hum | G06F 1/3296 713/100 |

(Continued)

*Primary Examiner* — Charles M Swift
(74) *Attorney, Agent, or Firm* — James T. Shepherd

(57) ABSTRACT

Methods and systems are provided for schedule deconfliction to enhance cooperation among heterogeneous teams of autonomous agents in situations where communication is severely limited. A dynamic scheduling framework, referred to herein as the Generous Agent Algorithm (GAA), organically deconflicts redundant service tasks as agents from distinct teams come into conflict and discover one another. Individual agents within a localized area can communicate their schedules to one another. Using the GAA, the agents propose modified schedules, vacating their most costly task from their schedules, while simultaneously augmenting their schedules with another agent's vacated task. The action taken by an agent does not increase an agent's makespan beyond the time set by that agent's team. Thus, the methods and systems, ensure that schedule alterations are done without degrading a team's global makespan.

18 Claims, 2 Drawing Sheets

(56) References Cited

U.S. PATENT DOCUMENTS

| | | | |
|---|---|---|---|
| 2015/0143364 A1* | 5/2015 | Anderson | G06F 9/45558 718/1 |
| 2015/0261459 A1* | 9/2015 | Manoharan | G06F 9/5033 711/114 |
| 2016/0098292 A1* | 4/2016 | Boutin | G06F 9/505 718/104 |
| 2017/0149687 A1* | 5/2017 | Udupi | H04L 47/78 |
| 2019/0243682 A1* | 8/2019 | Botelho | G06F 9/4881 |

* cited by examiner

AGENT CONFLICT RESOLUTION

STATEMENT OF GOVERNMENT INTEREST

The invention described herein may be manufactured and used by or for the Government of the United States of America for governmental purposes without the payment of any royalties.

BACKGROUND OF THE INVENTION

(1) Field of the Invention

The present invention relates to scheduling of assets, such as autonomous agents. More particularly, the present invention relates to deconflicting schedules when two or more competing agents attempt to execute the same task in an environment where communications may be limited or denied.

(2) Description of the Prior Art

The use of autonomous systems to perform increasingly complex and coordinated tasks has necessitated creating heterogeneous teams of agents, where different agent types specialize in different parts of an operation. One such heterogeneous team operation includes a mobile agent, or service agent, tasked with performing the direct servicing tasks for the operation. A larger, faster-moving, or longer-range agent, referred to herein as a transport agent, is responsible for transporting the service agents between jobs for faster completion.

Within manned systems, there are numerous examples of the transport agent/service agent concept such as aircraft carriers and their respective aircraft, garbage trucks and accompanying garbage workers and mail delivery vehicles and their respective postmen. While this form of close interaction between unmanned systems is still far from common, the underlying hardware and guidance infrastructure to allow autonomous docking and deployment between unmanned systems are being researched for a variety of different applications.

Just as important as the fundamental infrastructure of docking and deploying unmanned systems autonomously is determining the most efficient schedule for when and where to perform these actions when multiple agents can be assigned to perform an operation. Indeed, new methods of package delivery such as cooperative teams of aerial drones and shipping trucks are being explored by leading technology companies. Furthermore, cooperative teams of unmanned underwater vehicles (UUVs) and unmanned surface vessels (USVs) are quickly emerging where one unit performs the substantive survey operations while the other is used for transportation and refueling.

With an increasing prevalence of highly specialized teams of autonomous agents, there is a need for individuals within a multi-agent system to have "social ability". The term "social ability" is used herein to indicate an agent's need to have the capacity to share information and to negotiate with others to enhance cooperation. The prevailing thought among those of skill in the art is that this ultimately leads to more efficient task execution and flexibility with regards to dynamic and stochastic environments.

Central to this idea of "social ability" is communication between agents. However, in contested or harsh environments, communication (even between nearest neighbors) becomes not only challenging but also sometimes infeasible. Thus, the coordination of schedules, which is often a goal for this inter-agent communication, is made exceedingly difficult. Cross-schedule dependencies, or those tasks which tether one agent's schedule to another, often further complicate this goal.

Assume that non-communicating teams of autonomous agents generate detailed team schedules to prosecute the same set of tasks. This implies that there will be conflicts of schedules, redundancy of schedules, or both. Any of these cases can violate the common constraint in autonomous agent scheduling that no more than one agent can prosecute the same task.

There are numerous methods available in the art, which address task allocation and scheduling for strongly coupled mission tasks. However, the majority of these methods assume perfect, or nearly perfect, communication between agents. These centralized scheduling algorithms include mixed-integer linear programming (MILP) approaches to scheduling, as well as auction- and consensus-based methods.

Additionally, approaches have been developed to allow agents to schedule within a partially decentralized framework. However, harsh communication environments necessitate that scheduling algorithms seek to coordinate schedules under limited to no communication between agents of a team. These environments present a difficulty since they require that agents have the ability to adjust schedules while still observing the original constraints of the problem.

It has been shown that by using human-like decision behaviors for conflict resolution, heterogeneous teams of autonomous agents operating in limited communication environments can drastically reduce each team's task completion end time. These results are built on simplistic assumptions that serve as a suitable first approximation to encapsulating human-like negotiations, such as trading off tasking. However, these assumptions lack the heuristic complexity with which humans negotiate.

Thus, a need has been recognized in the state of the art to develop conflict resolution methods which do not require perfect, or nearly perfect, communication between agents. Further, it is necessary for these methods to be automated and not rely on overly complex by-hand calculations when the number of independent teams and the number of service agents become large. As such, scheduling algorithms are needed which can coordinate schedules with limited to no communication between agents.

Additionally, the conflict resolution methods need not be limited by either the teams or the centralized agent knowing everything about all the agents, including their costs to complete the task set. Agents need to have the ability to adjust schedules while still observing the original constraints of the problem.

SUMMARY OF THE INVENTION

It is therefore a general purpose and primary object of the present invention to provide methods and systems for schedule deconfliction to enhance cooperation among heterogeneous teams of autonomous agents in situations where communication is severely limited. A dynamic scheduling framework organically deconflicts redundant service tasks as agents from distinct teams come into conflict and discover one another. As used herein, discover indicates the process by which agents broadcast their intent to prosecute a service area once physically present at a service area.

The methods and systems encode human-like negotiations during conflict resolution. Individual agents propose modified schedules, vacating their most costly task from their schedules, while simultaneously augmenting their schedules with another agent's vacated task. This action by an agent, referred to herein as an act of generosity, must not increase an agent's makespan beyond the time set by the team. As used in the art, the makespan of a project is the distance in time that elapses from the start of work to the end. In other words, the makespan is the schedule completion time. Thus, the methods and systems, referred to herein as generous agent actions, or more particularly as the Generous Agent Algorithm (GAA), ensure that schedule alterations are done without degrading a team's global makespan.

The methods and systems allow agents from separate teams to resolve conflicts without communicating with their respective teams of agents. Thus, the methods and systems do not require perfect, or nearly perfect, communication between agents of a team. The only communication needed is short range communication between agents at a location where the agents discover a conflict.

Each agent can be configured with short range communications and processing equipment. Each agent can broadcast its task schedule data to agents in its local vicinity and can receive the task schedule data from nearby agents, such that conflicts are discovered. Working from the same data, each agent's local processor can use the GAA to coordinate its schedule with the other agents to deconflict the task, while not increasing its own team's makespan. Thus, the GAA conflict resolution method is not limited by the team's centralized agent nor the other members of an agent's team knowing everything about all the agents.

The agents have two deconfliction behaviors from which to choose. An agent can choose to execute a vacation, wherein an agent forfeits its most costly valid task, while agreeing to keep the task under conflict. Alternately, an agent can exhibit a generosity, wherein the agent takes on the burden of some other agent's task, while agreeing to not execute the task under conflict.

It can be intuitively assumed that a vacation of the most costly task by an agent decreases the agent's local end time. Similarly, a generosity can increase an agent's end time since it incorporates another task for prosecution. In this way, an agent is generous by taking on the task of another agent with a potential increase in its end time. However, the generous agent obtains the benefit of not having to prosecute the task under conflict.

An agent's capacity for generosity is tempered by the agent's generosity not increasing the agent's team makespan. Since the statement of the conflict problem states the agent is not in communication with its team, it is reasonable to decrease the agent's capacity for generosity by a function decreasing with the amount of time since an agent has been in contact with its team. Thus, the function can quantify the degree to which an agent feels confident in the value it has for its team's makespan. Additionally, the function can scale with an estimated number of agents in the field. If there are more agents in the field, then this implies there are ostensibly more conflicts of schedules.

In one embodiment, a method deconflicts schedules of a plurality of agents from a plurality of teams of agents, where each of the agents is scheduled to complete a same first task. The method includes the agents sharing data regarding their respective schedules among the plurality of agents, processing the data to determine a first agent to vacate the first task from its schedule and processing the data to determine a second agent to vacate a second task from its schedule. The method further includes vacating the first task from schedules of each agent other than from the schedule of the second agent and adding the second task to the schedule of the first agent.

Determining the first agent includes determining a cost of performing the first task for each of the plurality of agents and choosing the agent having the highest cost as the first agent. Determining the second agent includes determining a most costly task for each of the agents and choosing the agent having a costliest of the most costly tasks as the second agent.

Determining the cost of performing the first task further includes scaling the cost of each agent with reference to an end time of the schedule of each agent. Determining the most costly task further includes scaling a cost of the most costly task of each agent with reference to an end time of the schedule of the agent.

The method further includes constraining a choice of the first agent to an agent whose estimate of its end time is not increased by adding the second task to its schedule. The method also includes applying a function to the estimate of the end time, wherein the function decreases the estimate as an amount of time increases since the constrained agent was in contact with its team. The function decreases the estimate as the number of agents encountered by the constrained agent during execution of its schedule increases.

The function may also decrease the estimate as the number of agents inferred from the constrained agent communicating with other agents increases. One of the agents can be designated as an aggregator to collect and process the schedule data from each other agent.

In one embodiment, the method further includes processing the data to obtain a first measure of the most costly task of each of the agents and processing the data to obtain, for each agent, second measures of performing the most costly task of each of the other agents. The method further includes scaling the first measure and the second measures with reference to an estimated end time of the schedule of the each agent, storing the scaled measures in a decision matrix. The decision matrix is processed to select, as the first agent, the agent having the minimum second measures and to select, as the second agent, the agent having the maximum first measure.

In one embodiment, a method of deconflicting schedules of a plurality of agents is configured as a set of instructions on computer readable medium disposed within processors disposed in each of the agents. The instructions having the processor perform the steps of the method, including discovering a conflict among the agents, wherein agents are scheduled to perform a same task, with each of the agents recording the same task as a conflict.

The method includes updating each agent's respective conflict set and communicating scheduling data with other agents of the plurality of agents. The data is processed to obtain a first measure of a most costly task of each of the plurality of agents and to obtain, for each of the plurality of agents, second measures of performing the most costly task for each other of the plurality of agents. The first and second measures are scaled with reference to an estimated end time of the schedule of the each agent and the scaled measures are stored in a decision matrix.

The decision matrix is processed to select a first agent having a minimum of the second measures and to select a second agent having a maximum of the first measure. The task in conflict is vacated from schedules of each of the plurality of agents other than from the schedule of the second agent. A second task corresponding to the most costly task of the second agent is added to the schedule of the first agent and this second task is removed from the schedule of the second agent.

The method further includes constraining a choice of the first agent to an agent whose estimate of its end time is not increased by adding the second task to its schedule. The method also includes applying a function to the estimate of the end time, wherein the function decreases the estimate as an amount of time increases since the constrained agent was in contact with its team. The function decreases the estimate as the number of agents encountered by the constrained agent during execution of its schedule increases. The function may also decrease the estimate as the number of agents inferred from the constrained agent communicating with other agents increases. One of the agents can be designated as an aggregator to collect and process the schedule data from each other agent.

In one embodiment, a method of resolving a scheduling conflict among a plurality of agents, wherein each of the agents has a task schedule including performance of a same task, includes determining a first measure of a most costly task for each agent based on the task schedule of the each agent and determining, for each agent, second measures of performing the most costly task of each other agent. The method selects, as a first agent, the one agent having a minimum of the second measures. The method selects, as a second agent, the one agent having a maximum of the first measure. The method vacates the same task from the schedule of each of the plurality of agents other than from the schedule of the second agent and removes a second task corresponding to the most costly task of the second agent from the schedule of the second agent. The second task is added to the schedule of the first agent.

In determining the first measure and second measures, the measures are scaled with reference to an estimated end time of the schedule of each agent. The method includes applying a function to the estimated end time for each agent. The function decreases the estimated end time in proportion to an increasing amount of time since the each agent was in contact with a team of the each agent and the function further decreases the estimated end time in proportion to an increasing number of previous agents encountered by the each agent during execution of the schedule of each agent and/or agents inferred from each agent communicating with previous agents. The method also includes constraining a choice of the first agent to a constrained agent whose estimate of the end time is not increased by adding the second task to its schedule.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the views and wherein.

DESCRIPTION OF THE INVENTION

Figure 1:
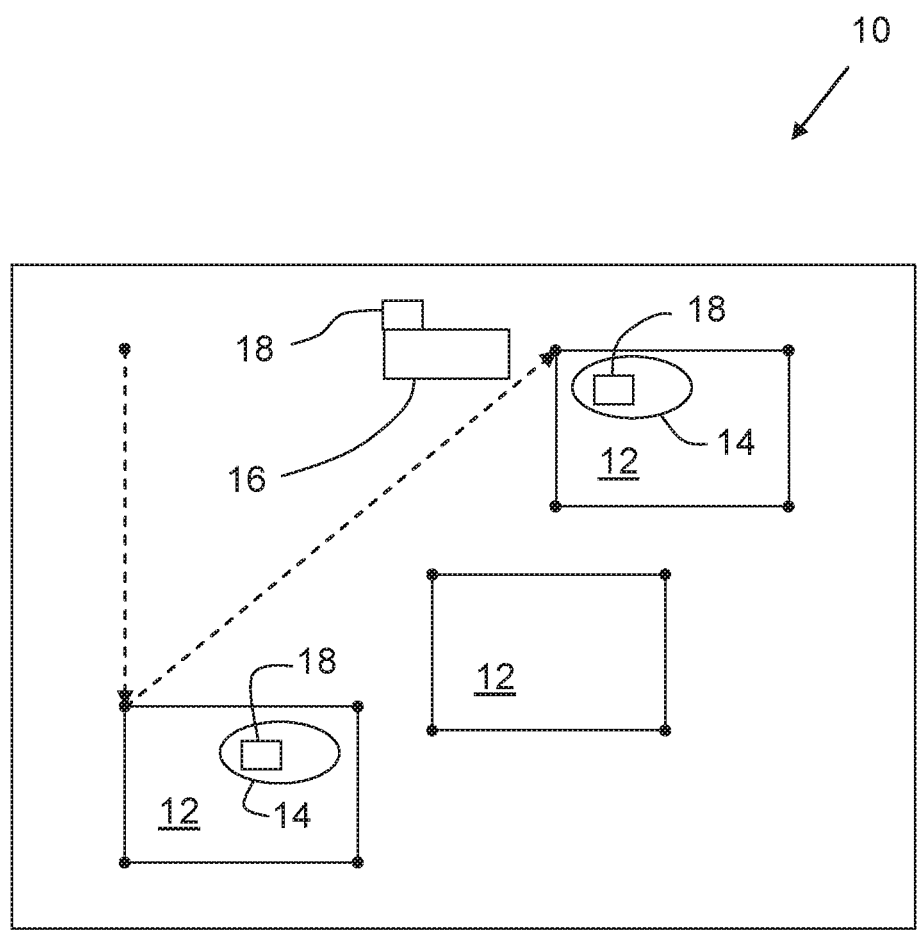
FIG. 1 is a notational illustration of the Service Agent Transport Problem (SATP)

Referring now to FIG. 1, there is shown a notational illustration 10 of the Service Agent Transport Problem (SATP). Let there exist a set of autonomous agents $A=\{1, \ldots, A\}$ that are tasked with servicing a number of service areas (12) $S=\{1, \ldots, S\}$. The agents are separated into two mutually exclusive and collectively exhaustive subsets $A_S$ and $A_T$ consisting of service agents (14) and transport agents (16), respectively. A service agent (14) $m \in A_S$ is capable of directly servicing the service areas 12, while a transport agent (16) $n \in A_T$ may collect a fixed number of the service agents (14) and transport them between service areas 12.

Given sets of agents, the SATP consists of finding a sequence of service agent (14) and transport agent (16) tasks $\bar{I}$, start times $T^{start}$ and end times $T^{end}$ that constitute a complete schedule $\bar{S}_a$ for every agent given by $$\bar{S}_a = \{\bar{I}_a, T_a^{start}, T_a^{end}\}. \tag{1}$$

The schedules should be developed such that all service areas (12, S) are serviced, fuel limitations are observed during each phase, all service agents (14) are docked with a transport agent (16) at the end of phase $P_a$ and the objective function $$\max_{a \in A_s} T_a^{end} P_a \tag{2}$$

is minimized. The variable $P_a$ denotes the last index for each agent's schedule. The task information is indicated by $\bar{I}_{a,p} = \{k, l_k\}$ and the task k is restricted to $k \in \{\text{move, service, dock, deploy}\}$. Tasks are executed at particular locations within the service area, encompassed by $l_k \in L_k$. The set of task-specific locations $L_k$ is a subset of the total areas S.

Given that a solution to the SATP can be obtained for a team of agents servicing area S, each agent of the team will have a definitive schedule of tasks to accomplish at specific locations. Since there may be multiple teams servicing area S, with each team developing its own schedule subject to the SATP, conflicts of schedules and/or redundancy can exist. Each agent includes communication and processing equipment 18, such that each agent may communicate with other nearby agents and process data regarding schedule conflicts.

Let $U^i(t)$ represent the i-th team at time t, where $t \in \mathbb{R}_l$, which is a set composed of service agents and transport agents, respectively, contained in team i, then $$U^i(t) := A_s^i; A_t^i | A_s^i \subset A_s, A_t^i \subset A_{t_l}. \tag{3}$$

As used herein, teams are denoted using the arbitrary superscript indices i and j. When necessary, the arbitrary subscript indices h and u are used to refer to specific service agents from different teams. Otherwise, a is simply used to refer to an arbitrary service agent. Agents belonging to a specific team at a certain time can be differentiated by writing $a_h \in U^i(t)$ to mean that agent $a_h$ belongs to team i at time t.

The entire team U is an exhaustive set such that all service agents (14) and all transport agents (16) are contained in U, $$U(t) := \bigcup_{i=1}^N U^i(t) = A_s \cup A_t, \tag{4}$$

where N is the total number of teams in the field. The preceding statement encapsulates the expectation that teams have the potential to change in size as members interact throughout the course of task execution. However, no additional agents are added from a global perspective for t>0.

The canonical team is defined to be composed of the service agents (14) and the transport agents (16) at t=0, (i.e., $U^i(0)$). For t>0, an agent $a_u$ from team $a_u \in U^{j \neq i}(0)$ will join team i, if the agent is within communication distance of some agent $a_h \in U^i(0)$. More formally, at some time t, if agent $a_u$ communicates with $a_h$ from team i, then $$U^i(t) \leftarrow U^i(0) \cup \{a_u\}. \tag{5}$$

Similarly, if an agent falls out of communication with its team, or if it leaves another team which it had previously joined (as is the case for $a_u$ in the preceding paragraph), then $$U^j(t) \leftarrow U^j(0) \setminus \{a_u\} \tag{6}$$

Consider that under a completely decentralized scheduling scheme there is the assumption that each team produces schedules subject to the SATP, where a team's makespan $\in^i$ results from the objective:

$$\epsilon^i := \min \max_{a \in U^i(0)} T_a^{end}, \tag{7}$$

where $T_a^{end}$ is the end time for any agent. As previously stated, since each team generates its own solution to the SATP, this can yield conflicts of schedules and or redundancy, which violate the constraint that mandates no task be assigned to more than one agent.

In this context, a conflict can be defined as a set of times $\tau_a$ for agent a when two or more agents from different teams (i.e., $a_h \neq a_u$, $a_h \in U^i(0)$, $a_u \in U^{j \neq i}(0)$) come within communication distance at a service area and broadcast their intent to prosecute the same task. A schedule conflict can be defined according to an overlap of start times for agents prosecuting the same task k at the same area $l_k$ in the same time window. More succinctly, the set of schedule conflict times is defined by $$\tau_{a_h} \approx \{T_{a_h,p_h}^{start} \in T_{a_h}^{start} \mid T_{a_h,p_h}^{start} \in [T_{a_u,p_u}^{start}, T_{a_h,p_h}^{end}], \tag{8}$$
$$\mathbb{1}_{a_h,p_h} = \mathbb{1}_{a_u,p_u}, a_h \in U^i(t), a_u \in U^j(t)\}.$$

Given the preceding statements, the deconfliction problem can be stated as:
Let the time of a conflict be $t_c$, and let $W(t_c)$ be the set of agents such that for every $a \in W(t_c)$, $t_c \in \tau_a$. For all agents $a \in W(t_c)$ attempting to execute the same task $k_1$ at location $l_{k_1}$, adjust each agent's schedule $\overline{S}_a$ such that all tasks $k \neq k_1$, with $$T_{a,p}^{start} > t_{c'}$$

are still completed; the task $k_1$ is assigned to at most one agent $a \in W(t_c)$; and the end time for an agent after schedule adjustment $\epsilon_a^i(t_c)$ where $a \in U^i(0)$, does not exceed $\epsilon^i$.

The agents, defined by the set $W(t_c)$, have two deconfliction behaviors from which to choose. In a first case, an agent can execute a vacation, wherein an agent forfeits its most costly valid task, while agreeing to keep the task under conflict. Alternately, an agent can exhibit a generosity, wherein the agent takes on the burden of some other agent's task, while agreeing to not execute the task under conflict.

It can be assumed that a vacation of the most costly task by an agent a decreases a's local end time. The agent's most costly task can be defined by $$T_{a,p_{MAX}} \approx \max_{p \in \{1,\ldots,P_a\}} (T_{a,p}^{end} - T_{a,p}^{end}), \tag{9}$$

A measure of this estimate can be defined according to $$\eta_a(t) := \min \max_{a \in U^i(0), W(t)} T_a^{vac}, \tag{10}$$

where $$T_a^{vac} \leftarrow T_a \setminus \{T_{a,p_{MAX}}\}. \tag{11}$$

The notational simplification $p_{MAX}$ is made to mean the index which yields the most costly task for agent a, or $$p_{MAX} := \operatorname*{argmax}_{p \in \{1,\ldots,P_a\}} (T_{a,p}^{end} - T_{a,p}^{start}). \tag{12}$$

It is noted that $\eta_a(t)$ from equation (10) indicates a calculation of a vacancy for agent a at t. Similarly, a local objective function can be defined for a generosity, which ostensibly increases the end time for an agent $a_h$, since it incorporates another task for prosecution. In this way, $a_h$ is generous by taking on the task of $a_u$ with a potential increase in its end time. However, there is the added benefit of not having to prosecute the task under conflict. This can be encapsulated by the objective function $$\gamma_{a_h}(t) := \min \max_{a_h \in U^i(0), W(t)} T_{a_h}^{gen}, \tag{13}$$

where $$T_{a_h}^{gen} \leftarrow (T_{a_h} \setminus \{T_{a_h,p_{conflict}}\}) \cup \{T_{a_u,p_{MAX}}\}, \tag{14}$$

and $a_u \neq a_h$. Similar to the previous case, the notational simplification $T_{a_h,p_{conflict}}$ is made to indicate the task under conflict.

However, a generosity is valid insofar as it observes the constraint given by $$f_a(\tau_{a,u}) \epsilon^i \geq \gamma_a(\tau_{a,u}), \tag{15}$$

where $\tau_{a,u} \in \tau_a$, the index $u=1, \ldots, |\tau_a|$ refers to a specific time of conflict from a's conflict set and the function $f_a:[t_{LAST}, \infty) \to [0,1]$, where $t_{LAST}$ is the last time at which agent a was in contact with its entire team.

The function, $f_a(\bullet)$, is designed to be a monotonically decreasing function with time, which quantifies the degree to which an agent feels confident in the value of the team's makespan. Thus, the function, $f_a(\bullet)$, damps the value of the team's global makespan for all times during which the agent is not in contact with its team. To ensure an agent loses its ability to be generous the longer it is not in communication with its entire team, $f_a(\bullet)$ will contain the condition that, in the infinite time limit, the function approaches zero.

Additionally, since $f_a(\bullet)$ quantifies the possibility that its team may have reassembled without it, the function should scale with an estimated number of agents in the field. If there are more agents in the field, then this implies there are ostensibly more conflicts of schedules (an unknown number of agents assigned to a known number of tasks). Therefore, if the team did reassemble without a's knowledge, then $\epsilon^i$ could change drastically thereby diminishing a's capacity for generosity. Thus, the implementation of $f_a(\bullet)$ can be stated as $$f_a(t) = \frac{2}{1 + \exp(|\alpha_a|(t - t_{LAST}))}, \quad (16)$$

where $\alpha_a$ contains a running list of all agents encountered by a throughout the course of task execution or those agents inferred from communication with others. The cardinality of $\alpha_a$ gives a's estimate of the number of agents in the field, thus ensuring that equation (16) decays more quickly for a larger estimate of agents.

Figure 2:
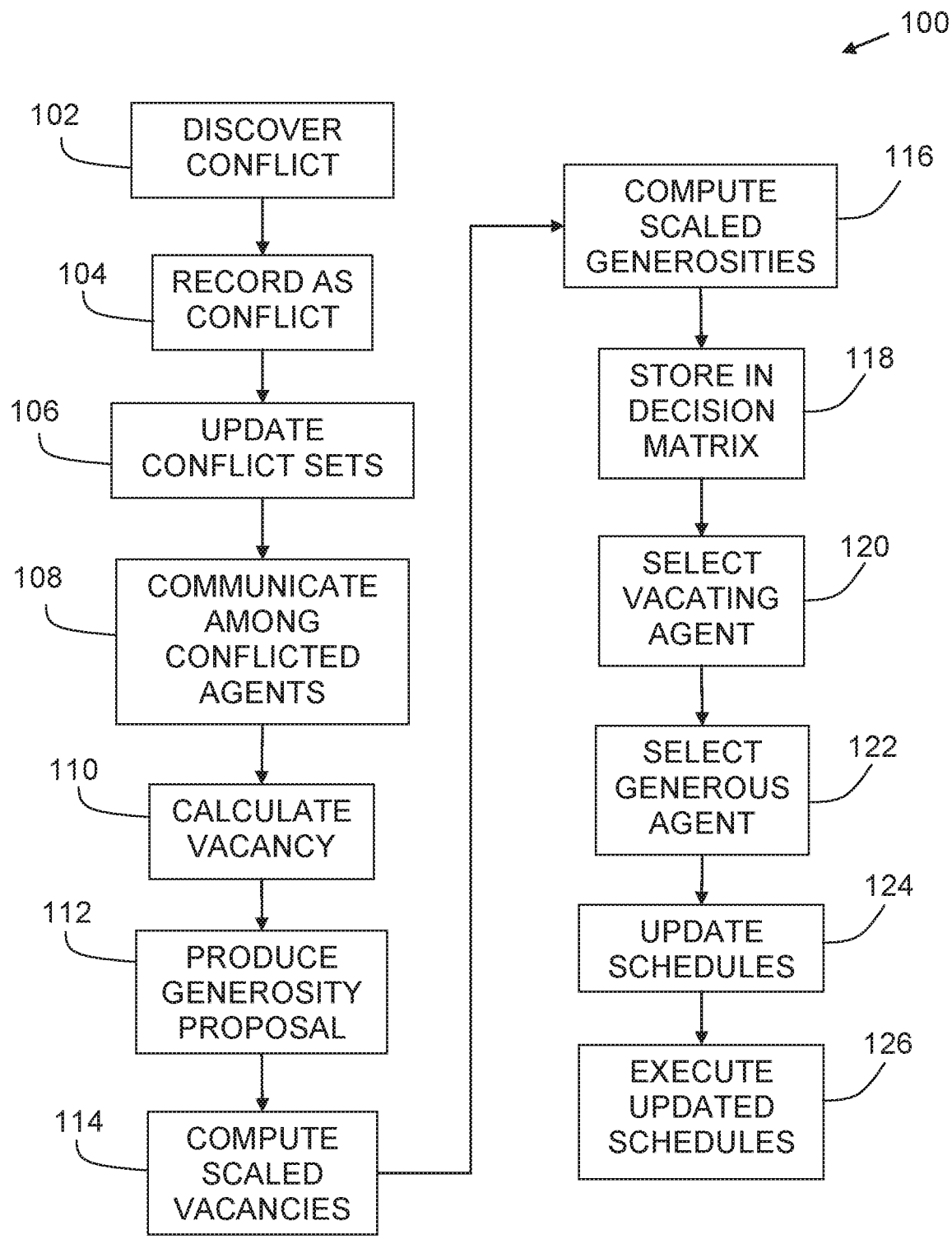
FIG. 2 illustrates a schematic block diagram of a method for deconflicting agent schedules.

Referring now to FIG. 2, there is shown a block diagram of method 100 for deconflicting schedules of service agents from separate teams of agents. The teams may service the same or overlapping areas. Since each team develops its own schedule, normally through a central command and control coordinator, there is a realistic probability that agents from one or more teams may be scheduled to perform the same task. Additionally, when service areas include harsh environments, an agent may not be able to communicate with other agents of its own team, or with its team's central coordinating node. Thus, an agent needs to be able to resolve conflicts on its own, with only the limited ability to communicate with nearby agents of other teams when conflicts arise with those agents.

Suppose a conflict is discovered to occur at time $t_c$ (block 102). Then all agents $a \in W(t_c)$ record this time as a conflict (block 104), updating their conflict sets accordingly $\tau_a \rightarrow \tau_a \cup \{t_c\}$ (block 106). Since these agents are now all within communication distance, they each can use their own communication portion of equipment 18 (FIG. 1) to communicate with each other, such that each becomes a part of every other's team (block 108). Hence for all $a \in W(t_c)$, $a_h \in U^i(0)$, where h, u=1, ..., $|W(t_c)|$, and u≠h, $$U^i(t_c) \rightarrow U^i(t_c) \cup \{a_u\}. \quad (17)$$

Now using the processing portion of their respective equipment 18 (FIG. 1), the agents then proceed by calculating and storing vacancies and generosities. Each agent $a \in W(t_c)$ can calculate a vacancy $\eta_{a_h}(t_c)$ according to equation (10) (block 110). Correspondingly, every other agent $a_u$ produces a generosity proposal $\gamma_{a_h}(t_c)$ using equation (13) (block 112).

However, these vacancies and generosities are meaningless without reference to the last measure of an agent's local end time $\epsilon_a^i(\tau_{a,\mu-1})$. Hence it is necessary to compute scaled vacancies (block 114) and generosities (block 116), respectively, as $$H_{a_h} = \epsilon_{a_h}^i(\tau_{a_h,\mu-1}) - \eta_{a_h}(t_c), \text{ and} \quad (18)$$

$$\Gamma_{a_u} = \epsilon_{a_u}^{j+i}(\tau_{a_u,\mu-1}) - \gamma_{a_u}(t_c). \quad (19)$$

The results are stored in a decision matrix (block 118), which for each row h, column h, stores agent $a_h$'s scaled vacation of its most costly task. All other columns u≠h in row h store proposed scaled generosities for including $a_h$'s most costly task.

$$\Delta := \begin{bmatrix} H_{a_1} & \Gamma_{a_2} & \cdots & \Gamma_{a_{|W(t_c)|}} \\ \Gamma_{a_1} & H_{a_2} & & \Gamma_{a_{|W(t_c)|}} \\ \vdots & & \ddots & \vdots \\ \Gamma_{a_1} & \Gamma_{a_2} & \cdots & H_{a_{|W(t_c)|}} \end{bmatrix}. \quad (20)$$

With each agent having the decision matrix (20) information, they can calculate which agent benefits the most from a vacation and which agent suffers the least from a generosity. The agent who satisfies $$v := \underset{a_h \in W(t)}{\operatorname{argmax}} |\Delta(h, h)| \quad (21)$$

is selected as the vacating agent, $a_v$ (block 120). The agent who satisfies $$g := \underset{a_u \in W(t), u \neq v}{\operatorname{argmin}} |\Delta(v, u)| \quad (22)$$

is selected as the generous agent, $a_g$ (block 122), subject to the constraint set in equation (15). Once $a_v$ and $a_g$ are determined, then all the agents can update their respective schedules (block 124). Vacating agent $a_v$ updates its schedule according to equation (11). Generous agent $a_g$ updates its schedule according to equation (14). For all other agents, each updates its schedule to exclude the currently conflicted task. The agents then proceed to execute their updated schedules (block 126), with agent $a_v$ forfeiting its most costly valid task, while agreeing to keep the task under conflict, agent $a_g$ taking on the burden of agent $a_v$'s most costly task, while agreeing to not execute the task under conflict and all other agents proceeding to execute their subsequent scheduled tasks.

What has thus been described are methods and systems for schedule deconfliction to enhance cooperation among heterogeneous teams of autonomous agents in situations where an agent's communication with its team's command and control center is severely limited. A Generous Agent Algorithm (GAA) is executed to deconflict redundant service tasks as agents from distinct teams come into conflict and discover one another. Individual agents within a localized area can communicate their schedules to one another.

Using the GAA, the agents propose modified schedules. The agents calculate which agent benefits the most from a task vacation. That agent is selected to vacate their most costly task from their schedule and maintain the task in conflict. The agents also calculate which agent suffers the least from taking on the vacating agent's most costly task. That agent is selected to take on the vacated task, while vacating the conflicted task. The actions taken are constrained such that an action does not increase an agent's makespan beyond the time set by that agent's team. Thus, the methods and systems ensure that schedule alterations are done without degrading a team's global makespan.

Obviously, many modifications and variations of the present invention may become apparent in light of the above teachings. For example, the configuration of blocks in method 100 can be changed to suit the agents' processing capabilities used in executing the GAA. Additionally, one of the agents involved in the deconfliction can be designated as an aggregator, who collects and assembles the decision matrix (20). This may be the first agent who discovers the conflict or may be the agent possessing the most efficient processor. Further, there may be two or more agents satisfying the benefit condition shown in equation (21). In this case, the first agent to satisfy the condition can be selected by default.

It will be understood that many additional changes in the details and methods which have been described herein and illustrated in order to explain the nature of the invention, may be made by those skilled in the art within the principle and scope of the invention as expressed in the appended claims.

What is claimed is:

1. A method of deconflicting schedules of a plurality of agents from a plurality of teams of agents, each of said plurality of agents scheduled to complete a same first task, said method comprising:
   said agents sharing data regarding their respective schedules among the plurality of agents;
   processing said data to determine a first agent to vacate said first task from a schedule of said first agent;
   processing said data to determine a second agent to vacate a second task from a schedule of said second agent;
   vacating said first task from schedules of each of said plurality of agents other than from said schedule of said second agent;
   adding said second task to said schedule of said first agent;
   wherein determining said first agent comprises determining a cost of performing said first task for each of said plurality of agents, and choosing a one of said agents having a highest cost as said first agent; and
   wherein determining said second agent comprises
      determining a most costly task for each of said plurality of agents, and
      choosing a one of said agents having a costliest of said most costly tasks as said second agent.

2. The method of claim 1, wherein determining a cost of performing said first task further comprises scaling said cost of each agent with reference to an end time of said schedule of said each agent.

3. The method of claim 2, wherein determining a most costly task further comprises scaling a cost of said most costly task of each agent with reference to an end time of said schedule of said each agent.

4. The method of claim 3, further comprising constraining a choice of said first agent to a constrained agent whose estimate of said end time is not increased by adding said second task to said schedule of said constrained agent.

5. The method of claim 4, further comprising applying a function to said estimate of said end time wherein said function decreases said estimate as an amount of time increases since said constrained agent was in contact with a team of said constrained agent.

6. The method of claim 5, wherein said function further decreases said estimate as a number increases of at least one of agents encountered by said constrained agent during execution of said schedule of said constrained agent and agents inferred from said constrained agent communicating with other agents.

7. The method of claim 6, wherein said plurality of agents comprises an aggregator agent, and further comprising the step of said aggregator collecting and processing said schedule data from each other agent.

8. The method of claim 1, further comprising:
   processing said data to obtain a first measure of a most costly task of each of said plurality of agents;
   processing said data to obtain for each of said plurality of agents second measures of performing said most costly task for each other of said plurality of agents;
   scaling said first measure and said second measure with reference to an estimated end time of said schedule of said each agent;
   storing said scaled measures in a decision matrix;
   processing said decision matrix to select said first agent as having a minimum of said second measures;
   and processing said decision matrix to select said second agent as having a maximum first measure.

9. The method of claim 8, further comprising constraining a choice of said first agent to a constrained agent whose estimate of said end time is not increased by adding said second task to said schedule of said constrained agent.

10. The method of claim 9, further comprising applying a function to said estimate of said end time, wherein:
    said function decreases said estimate as an amount of time increases since said constrained agent was in contact with a team of said constrained agent; and
    said function further decreases said estimate as a number increases of at least one of agents encountered by said constrained agent during execution of said schedule of said constrained agent and agents inferred from said constrained agent communicating with other agents.

11. A method of deconflicting schedules of a plurality of agents, said method configured as a set of instructions on computer readable medium disposed within a processor, one said processor being disposed in each of said agents, said instructions for said processor to perform the steps of said method, comprising:
    discovering a conflict among said agents, wherein agents are scheduled to perform a same task;
    each of said agents recording said same task as a conflict, updating its respective conflict set and communicating scheduling data with other agents of said plurality of agents;
    processing said data to obtain a first measure of a most costly task of each of said plurality of agents;
    processing said data to obtain for each of said plurality of agents second measures of performing said most costly task for each other of said plurality of agents;
    scaling said first measure and said second measures with reference to an estimated end time of said schedule of said each agent;
    storing said scaled measures in a decision matrix;
    processing said decision matrix to select a first agent having a minimum of said second measures;
    processing said decision matrix to select a second agent having a maximum of said first measure;
    vacating said same task from schedules of each of said plurality of agents other than from said schedule of said second agent;
    adding a second task to said schedule of said first agent, said second task corresponding to said most costly task of said second agent; and
    removing said second task from said schedule of said second agent.

12. The method of claim 11, further comprising constraining a choice of said first agent to a constrained agent whose estimate of said end time is not increased by adding said second task to said schedule of said constrained agent.

13. The method of claim 12, further comprising applying a function to said estimate of said end time, wherein:
  said function decreases said estimate as an amount of time increases since said constrained agent was in contact with a team of said constrained agent; and
  said function further decreases said estimate as a number increases of at least one of agents encountered by said constrained agent during execution of said schedule of said constrained agent and agents inferred from said constrained agent communicating with other agents.

14. The method of claim 13, wherein said plurality of agents comprises an aggregator agent, and further comprising the step of said aggregator collecting and processing said schedule data from each other agent.

15. A method of resolving a scheduling conflict among a plurality of agents, each of said agents having a task schedule including performance of a same task, said method comprising:
  determining a first measure of a most costly task for each agent based on said task schedule of said each agent;
  determining, for each agent, second measures of performing said most costly task of each other agent;
  selecting, as a first agent, a one of said agents having a minimum of said second measures;
  selecting, as a second agent, a one of said agents having a maximum of said first measure;
  vacating said same task from said schedule of each of said plurality of agents other than from said schedule of said second agent;
  removing a second task from said schedule of said second agent, said second task corresponding to said most costly task of said second agent; and
  adding said second task to said schedule of said first agent.

16. The method of claim 15, wherein determining said first measure and said second measures further comprises scaling said first measure and said second measures with reference to an estimated end time of said schedule of said each agent.

17. The method of claim 16, further comprising applying a function to said estimated end time for each agent, wherein:
  said function decreases said estimated end time in proportion to an increasing amount of time since said each agent was in contact with a team of said each agent; and
  said function further decreases said estimated end time in proportion to an increasing number of at least one of previous agents encountered by said each agent during execution of said schedule of each said agent and agents inferred from said each agent communicating with previous agents.

18. The method of claim 17, further comprising constraining a choice of said first agent to a constrained agent whose estimate of said end time is not increased by adding said second task to said schedule of said constrained agent.

* * * * *